United States Patent [19]

Wiand

[11] Patent Number: 4,613,437
[45] Date of Patent: Sep. 23, 1986

[54] COOLANT FILTERING SYTEM

[76] Inventor: Ronald C. Wiand, 1255 Villa, Birmingham, Mich. 48008

[21] Appl. No.: 634,144

[22] Filed: Jul. 24, 1984

[51] Int. Cl.⁴ .............................................. B01D 29/26
[52] U.S. Cl. .................................... 210/315; 210/342; 210/416.5; 210/469; 210/497.3
[58] Field of Search ............... 210/168, 171, 196, 244, 210/248, 256, 257.1, 261, 315, 316, 317, 342, 416.1, 416.5, 420, 455, 456, 457, 458, 460, 464, 469, 473, 474, 475, 476, 477, 489, 497.01, 499; 51/284 R, 266, 267; 208/179; 184/6.24

[56] References Cited

U.S. PATENT DOCUMENTS

| 911,583 | 2/1909 | Focht | 210/473 |
| 1,332,358 | 2/1920 | Petersen | 210/477 |
| 2,675,102 | 4/1954 | Scales | 210/476 |
| 2,835,392 | 5/1958 | Hamilton | 210/477 |
| 2,955,390 | 10/1960 | Phillips | 184/6.24 |
| 3,239,065 | 3/1966 | Hunt | 210/455 |
| 3,920,554 | 11/1975 | Sanders | 210/476 |
| 4,205,710 | 6/1980 | Dunicz | 210/456 |
| 4,344,777 | 8/1982 | Siposs | 210/456 |

FOREIGN PATENT DOCUMENTS 208400 1/1923 United Kingdom ............... 210/456

Primary Examiner—Richard V. Fisher
Assistant Examiner—Wanda L. Millard
Attorney, Agent, or Firm—Harness, Dickey & Pierce

[57] ABSTRACT

A coolant filter assembly is described particularly adapted for filtering particulate matter from coolant fluid used with corrective lens grinding and edging machines. The device has a bowl-shaped housing which has an opened upper end and a lower end having a fluid outlet duct. A primary filter screen is attached across the opened end of the housing and is preferably made from stainless steel wire mesh. The central portion of the primary filter screen is covered by a coolant distribution dish which radially distributes discharged contaminated coolant fluid around the periphery of the primary filter screen. After passing through the primary filter screen, coolant material flows through a pair of concentrically arranged cylindrical particulate filters and thereafter is discharged through the outlet duct into a coolant tank. The device is easily used with existing coolant handling systems and features removable filter elements for cleaning or replacement.

19 Claims, 3 Drawing Figures

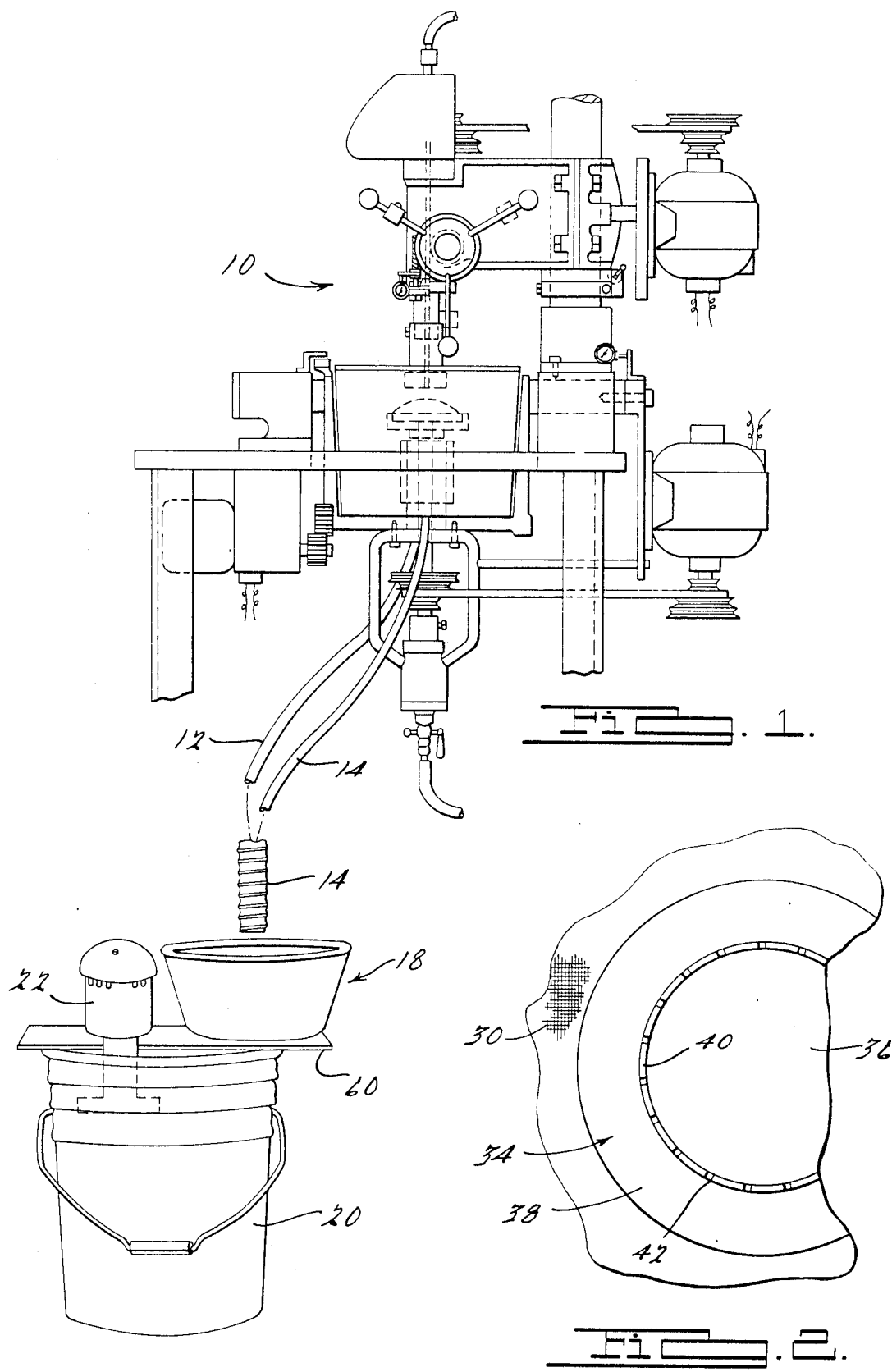

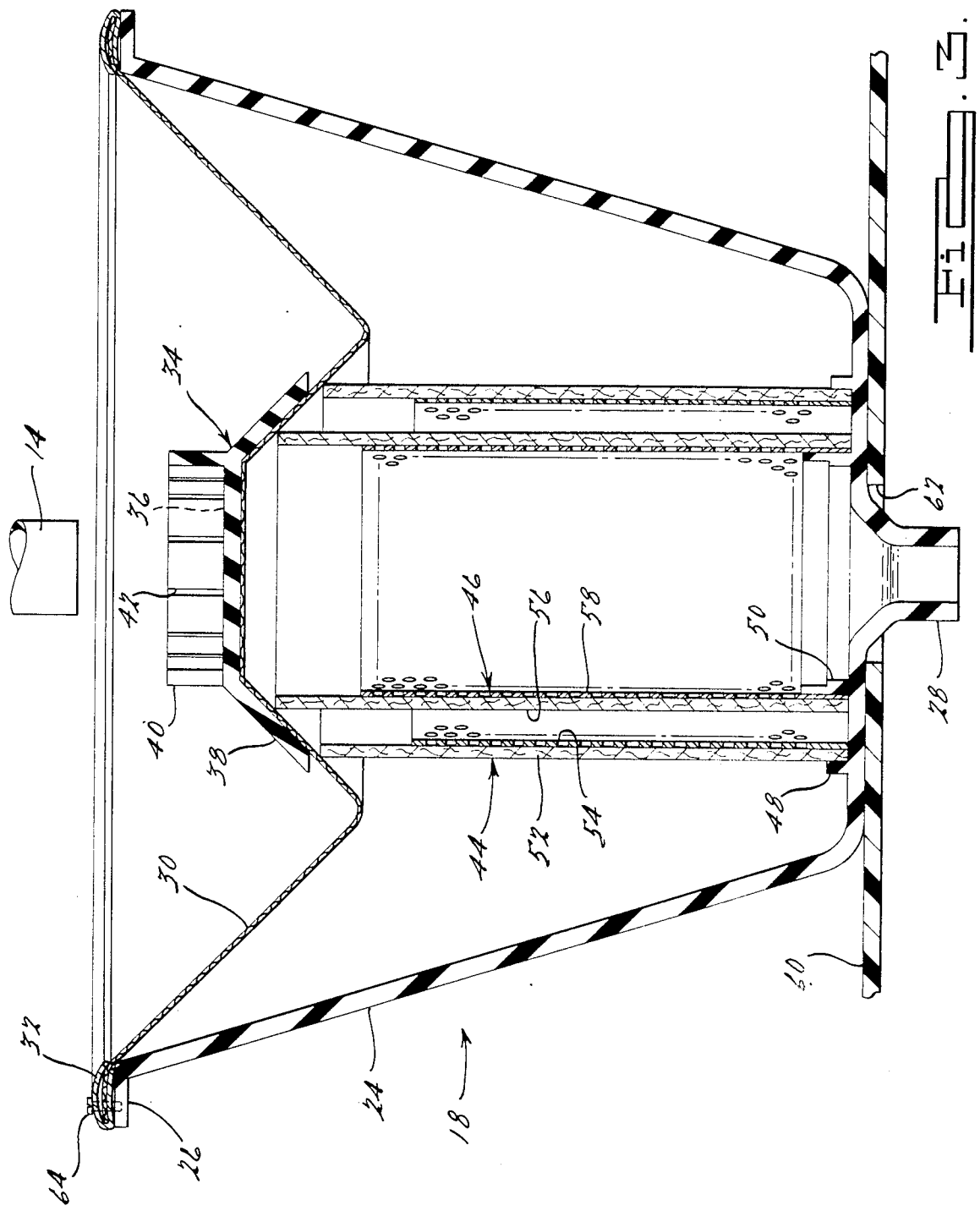

COOLANT FILTERING SYTEM

BACKGROUND AND SUMMARY OF THE INVENTION

This invention relates to a filtration system and particularly to a filter assembly for removing particulate matter from coolant employed in optical corrective lens grinding operations.

Grinding and edging machines are used during the production of glass and plastic optical corrective lenses. These machines typically use rotating abrasive grinding wheels which remove material from a lens blank to produce a finished lens. This operation is typically carried out with the use of a liquid coolant fluid which lubricates the grinding wheel and blank, cools the workpiece and tool, and carries away particulates generated by the grinding operation. Since the coolant fluid is ordinarily recycled, it is desirable to provide a filter device which removes most of the particulates from the coolant fluid before it is recycled and again used in the grinding or edging machine. Absent a filtration system, the presence of particulate matter in the recycled coolant can lead to grinding inaccuracies and surface imperfections in the finished lens. Additionally, filtering the coolant fluid promotes the life of grinding wheels used in lens finishing machines. In addition to the desirability of providing a filtration system for the coolant fluid, it is further desirable to provide a filter assembly which will operate for an extended period of time without cleaning or replacement. It is further desirable to provide a filter assembly adapted to be used in connection with existing lens grinding and edging machinery without significant modification. In accordance with this invention, a coolant filtering system is provided having the above-mentioned desirable features.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a pictorial view of an exemplary corrective lens edging machine with which this invention is advantageously employed and further showing a coolant outlet conduit positioned over the coolant filter assembly according to this invention and showing a coolant tank and pump provided for redistribution of cleaned coolant fluid to the edging machine;

FIG. 2 is a partial top view of a coolant filter assembly according to this invention particularly showing the centrally disposed coolant distribution dish;

FIG. 3 is a radial cross-sectional view of the coolant filtering assembly according to this invention showing the internal components thereof.

DETAILED DESCRIPTION OF THE INVENTION

FIG. 1 illustrates an exemplary corrective lens processing machine with which this invention is advantageously employed. Bevel edging machine 10 is shown of the type which grinds the edges of a corrective lens blank. An example of such a lens processing machine is described by U.S. Pat. No. 2,955,390, issued to E. D. Phillips, on Oct. 11, 1960. Machine 10 is shown for illustrative purposes only. A filter assembly according to this invention is equally usable with any type of lens machining apparatus employing coolant fluid which becomes contaminated with particulates during use. Bevel edging machine 10 includes coolant inlet and outlet conduits 12 and 14 respectively. Coolant fluid is drawn or pumped into coolant inlet conduit 12 where it is directed at the interface between the lens blank and grinding tool. Contaminated coolant fluid is trapped and drained from bevel edging machine 10 through coolant outlet conduit 14. Coolant exiting through coolant outlet conduit 14 is drained into coolant filter assembly 18, constructed according to this invention. As will be described subsequently, coolant filter assembly 18 cleans and rejuvenates coolant fluid. After treatment by coolant filtering assembly 18, fluid is drained into coolant tank 20, which acts as a reservoir for coolant fluid. Coolant pump 22 causes fluid to be withdrawn from coolant tank 20 and pumped into coolant inlet conduit 12 to bevel edging machine 10.

The details of construction of coolant filtering assembly 18 and the components thereof are best explained with reference to FIGS. 2 and 3. Outer shell 24 acts as a housing for the device and retains the internal components in position. Outer shell 24 is preferably made from polymeric plastic material and has a generally bowl-like shape with an enlarged upper opened end terminating in radially extending flange 26. The lower end of outer shell 24 is closed except that it has a centrally located outlet duct 28.

Extending across the upper opened end of outer shell 24 is primary filter screen 30 which is preferably made from stainless steel wire mesh material. Primary filter screen 30 is preferably shaped as shown by FIG. 3, forming a modified "W" configuration, in a cross-sectional view. This shape produces a circular trough forming a lowermost screen circular portion located radially between the outer peripheral edge of filter screen 30 and its center. The outer peripheral edge of primary filter screen 30 can be affixed to flange 26 by compression between the flange and retention ring 32. Retention ring 32 can be interlockingly engaged with flange 26, or mehcanical fasteners such as screws 64 may be employed to attach these components. Centrally located within the opened end of outer shell 24 and bonded to primary filter screen 30 is coolant distribution dish 34. Dish 34 forms a cover over the central portion of outer shell 24 opened end and has a flat disc-shaped center section 36, and a downwardly deflected peripheral flange 38. Cylindrical flange 40 extends upwardly from the perimeter of center section 38. Flange 40 features a plurality of regularly radially spaced slots 42, as particularly shown by FIG. 2.

Installed within the interior cavity of outer shell 24 is coarse filter assembly 44 and final filter assembly 46. Final filter assembly 46 is concentrically disposed within coarse filter assembly 44. Filter assemblies 44 and 46 act to support the central portion of primary filter screen 30 and coolant distribution dish 34. The concentric positioning of the filter assemblies may be maintained by a pair of concentrically extending circular flanges 48 and 50, which extend upwardly from the lower surface of outer shell 24. Coarse filter assembly 44 is composed of two primary components, coarse filter media 52 and coarse filter support 54. Coarse filter media 52 is preferably made from a fabric material and is intended to trap relatively coarse particulates present within coolant fluid which are small enough to pass through primary filter screen 30. Coarse filter media 52 is mechanically supported by coarse filter support 54 which is preferably a perforated metal cylinder or made from a fairly rigid screen-type material. Radially spaced inwardly from coarse filter assembly 44 is final filter assembly 46 which is also composed of two primary components, final filter media 56 and final filter support 58. Final filter media 56 is also preferably a fabric-type filter which is intended to filter out minute particulates from coolant fluid which are not trapped by either primary filter screen 30 or coarse filter assembly 44.

As shown by FIG. 1, coolant filter assembly 18 is positioned on assembly support 60, which extends across the upper opened end of coolant tank 20 and also provides a mounting location for coolant pump 22. As shown by FIG. 3, opening 62 is provided within assembly support 60 to permit fluid to be drained from coolant filter assembly 18 into coolant tank 20.

In use, coolant filtering assembly 18 is positioned with respect to coolant outlet conduit 14 such that contaminated coolant fluid is drained onto center section 36 of coolant distribution dish 34. Slots 42 within flange 40 are provided to direct contaminated coolant fluid to be distributed radially about primary filter screen 30. Thereafter, coolant fluid flows through primary filter screen 30 which acts to prevent the passage of large particulates and also acts to break up any foam that might exist with coolant fluid being discharged. Coolant fluid then settles within the lower outer portion of outer shell 24, where it flows first through coarse filter assembly 44, then through final filter assembly 46, and thereafter becomes drained through outlet duct 28. Coarse filter media 52 further acts to break up foam present with the coolant fluid.

As filter assemblies 44 and 46 become contaminated with particulate matter, coolant fluid within the outer radial portion of outer shell 24 will be caused to accumulate to increasing levels. This process will continue until the entire vertical surfaces of the filter assemblies are contaminated to the extent that they will no longer transmit significant quantities of coolant fluid. Once this extent of blockage exists, accumulated coolant fluid will be visible in the lowermost portions of primary filter screen 30, thereby providing a visual indication to the operator that filter assembly cleaning or replacement is necessary.

Primary filter screen 30 is easily cleaned by removing retained material by shaking it over a trash receptacle or by rinsing the screen. Filter assemblies 44 and 46 may be removed from coolant filter assembly 18 for washing and/or replacement. Removal of the filter assemblies is achieved by disengaging retention ring 32 from flange 26, thereby permitting removal of primary filter screen 30 and coolant distribution dish 34.

While the above description constitutes the preferred embodiments of the present invention, it will be appreciated that the invention is susceptible to modification, variation and change without departing from the proper scope and fair meaning of the accompanying claims.

What is claimed is:

1. A filter assembly for removing particulates from coolant fluid comprising:
    a bowl-shaped outer shell having an upper opened end and a lower end having a coolant outlet duct,
    a primary filter screen covering said upper opened end of said outer shell,
    cylindrical filter means mounted within said outer shell such that coolant fluid passing through said primary filter screen must pass through said filter means before being discharged through said coolant outlet duct, and
    a coolant distribution dish mounted to said primary filter screen and covering a central portion of said primary filter screen, said dish further covering the outside diameter of said cylindrical filter means thereby preventing said coolant fluid from passing directly to said coolant outlet duct.

2. The filter assembly according to claim 1 wherein said cylindrical filter means comprises first and second cylindrical filter assemblies, said first filter assembly located concentrically outside said second filter assembly.

3. The filter assembly according to claim 2 wherein said first and second filter assemblies are located by locating means within said lower end of said outer shell.

4. The filter assembly according to claim 3 wherein said locating means comprises upwardly extending projections formed by said lower end of said outer shell.

5. The filter assembly according to claim 1 wherein said primary filter screen is attached to the peripheral edge of said outer shell opened end by releasable retention means, thereby permitting removal of said primary filter screen and providing access to said cylindrical filter means.

6. The filter assembly according to claim 5 wherein said retention means comprises a retention ring which is attached to said peripheral edge by fasteners thereby compressing said primary filter screen between said retention ring and said peripheral edge.

7. The filter assembly according to claim 1 wherein said dish is further shaped to radially distribute said coolant fluid about said primary filter screen when said coolant fluid is directed against the upper surface of said dish.

8. The filter assembly according to claim 1 wherein said dish further forms an upwardly extending circular flange having a plurality of radially spaced slots therein, said circular flange distributing said coolant fluid about said primary filter screen when said coolant fluid is discharged within said circular flange.

9. The filter assembly according to claim 1 wherein said dish is bonded to said primary filter screen.

10. A filter assembly for removing particulates from coolant fluid comprising:
    a bowl-shaped outer shell having an upper opened end and a lower end having a central coolant outlet duct,
    a primary filter screen covering said upper opened end of said outer shell,
    a coolant distribution dish mounted to said primary filter screen and covering a central portion of said primary filter screen such that, as said coolant fluid is directed at said coolant distribution dish, said coolant is radially distributed about said primary filter screen, and
    first and second cylindrical filter assemblies mounted within said outer shell, said filter assemblies supported at their lower end by said outer shell lower end, said first filter assembly located concentrically outside said second filter assembly, said primary filter and said first and second filter assembly having filtering characteristics such that progressively smaller particles are filtered from said coolant fluid as said coolant fluid passes through said primary filter screen and then through said first and second filter assemblies, said coolant distribution dish covering the outside diameter of said first cylindrical filter assembly thereby preventing direct communication of coolant fluid with said coolant outlet duct.

11. The filter assembly according to claim 10 wherein said first and second filter assemblies are located by locating means within said lower end of said outer shell.

12. The filter assembly according to claim 11 wherein said locating means comprises upwardly extending projections formed by said lower end of said outer shell.

13. The filter assembly according to claim 10 wherein said primary filter screen is attached to the peripheral edge of said outer shell opened end by releasable retention means, thereby permitting removal of said primary filter screen and providing access to said cylindrical filter assembly.

14. The filter assembly according to claim 13 wherein said retention means comprises a retention ring which is attached to said peripheral edge by fasteners thereby compressing said primary filter screen between said retention ring and said peripheral edge.

15. The filter assembly according to claim 10 wherein said primary filter screen is shaped, when installed within said outer shell, to form a lowermost circular portion located radially between the outer peripheral edge of said outer shell, and the center of said dish.

16. The filter assembly according to claim 15 wherein said lowermost portion of said primary filter screen is located below the uppermost extremity of said cylindrical filter assembly such that when said cylindrical filter assembly becomes clogged with particulates, the level of said coolant retained within said outer shell rises above said lowermost portion thereby providing a visual indication to an operator that said cylindrical filter assembly has become clogged.

17. The filter assembly according to claim 10 wherein said coolant distribution dish further forms an upwardly extending circular flange having a plurality of radially spaced slots therein, said circular flange distributing said coolant fluid about said primary filter screen when said coolant fluid is discharged within said circular flange.

18. The filter assembly according to claim 10 wherein said coolant distribution dish is bonded to said primary filter screen.

19. A filter assembly for removing particulates from coolant fluid comprising:
a bowl-shaped outer shell having an upper opened end and a lower end having a coolant outlet duct,
a primary filter screen covering said upper opened end of said outer shell,
cylindrical filter means mounted within said outer shell such coolant fluid passing through said primary filter screen must pass through said filter means before being discharged through said coolant outlet duct, and
a coolant distribution dish mounted to said primary filter screen and covering a central portion of said primary filter screen thereby preventing said coolant fluid from passing directly to said coolant outlet duct, said primary filter screen being shaped, when installed within said outer shell, to form a lowermost circular portion located radially between the outer peripheral edge of said outer shell, and the center of said dish, said lowermost portion of said periphery filter screen being located below the uppermost extremity of said cylindrical filter means such that when said cylindrical filter means becomes clogged with particulates, the level of said coolant retained within said outer shell rises above said lowermost potion, thereby providing a visual indication to an operator that said cylindrical filter means has become clogged.

* * * * *